United States Patent [19]
Kane

[11] Patent Number: 5,411,055
[45] Date of Patent: May 2, 1995

[54] FLOW LIMITING THROTTLE ELEMENT

[75] Inventor: Brian Kane, Budenheim, Germany

[73] Assignee: Mannesmann Aktiengesellschaft, Dusseldorf, Germany

[21] Appl. No.: 156,078

[22] Filed: Nov. 23, 1993

[30] Foreign Application Priority Data

Nov. 24, 1992 [DE] Germany .................. 42 40 669.2

[51] Int. Cl.$^6$ ............................................. F16K 15/02
[52] U.S. Cl. .................................. 137/513.5; 137/528
[58] Field of Search ............... 137/513.5, 540, 528, 137/513.3

[56] References Cited

U.S. PATENT DOCUMENTS

| | | | |
|---|---|---|---|
| 2,742,057 | 4/1956 | Krieck | 137/513.5 X |
| 2,748,797 | 6/1956 | Heizer | 137/513.5 X |
| 3,595,265 | 7/1971 | Cryder | 137/513.5 |
| 3,788,352 | 1/1974 | Ane | 137/513.5 X |

FOREIGN PATENT DOCUMENTS 1060822  7/1959  Germany ........................ 137/513.3

Primary Examiner—Robert G. Nilson
Attorney, Agent, or Firm—Cohen, Pontani, Lieberman, Pavane

[57] ABSTRACT

A flow limiting throttle element for restricting the flow of a fluid guided in a delivery line, including a pressure-tight housing having a first bore hole portion, a second bore hole portion adjoining the first bore hole portion and two coaxially arranged working connections. A substantially cylindrical piston is arranged in the first bore hole portion of the housing so as to be freely axially displaceable therein, the first bore hole portion having a length that is at least 50% of the piston length. Overflow ducts are arranged in an outer surface area of the piston and the second bore hole portion of the housing has a cylindrical recess which communicates with the overflow ducts and transits into a first one of the working connections. The first working connection having an inner diameter smaller than that of the second bore hole portion. Additionally, a connection nipple is sealingly arranged in the first working connection, and has an annular end face which is situated in the housing so as to project into a region of the cylindrical recess and form a sealing fit with a first end face of the piston which faces the nipple end face. A first continuous slot is arranged on the first end face of the piston so as to continuously communicate with the cylindrical recess of the second bore hole portion without regard to the axial position of the piston.

12 Claims, 1 Drawing Sheet

FLOW LIMITING THROTTLE ELEMENT

BACKGROUND OF THE INVENTION

1. Field of the Invention

The invention is directed to a flow limiting throttle element for restricting the flow of a fluid guided in a delivery line.

2. Description of the Prior Art

Throttle points are installed for the purpose of a simple regulation of the rate of a fluid flowing through a delivery line. Such throttles are fundamentally distinguished as nonadjustable and adjustable. Nonadjustable signifies that the desired reduction in rate is determined once and for all by the type of constriction and its cross section so that the rate of flow depends only on viscosity, i.e. is primarily a function of temperature. In an adjustable throttle, the cross section of the reduction can be changed in stages or in a continuous manner from the outside. This can be actuated mechanically, hydraulically, pneumatically or electrically. If throttling is to be effected in only one flow direction and a free flow is required when the flow direction is reversed, a so-called throttle check element or flow limiting throttle element is selected for controlling the rate of flow.

In order to achieve the desired throttling, at least one or more small bore holes are arranged in the actual throttle body in a simple manner so that the fluid which is supplied over a substantially larger cross section is pressed through this constriction. This construction has the disadvantage that particles of dirt can easily lodge in the narrow bore holes and under certain circumstances can completely block flow. This is unacceptable for critical applications such as in aircraft construction for actuating important functional elements. For this reason, it is recommended that a sieve be arranged in these locations for such applications in order to catch particles of dirt. Since the structural component parts are generally very small, the arrangement of a sieve is often difficult in terms of construction, especially since the sieve must be arranged so as to be exchangeable in many cases to prevent clogging.

U.S. Pat. No. 3,595,265 discloses a self-cleaning test valve which provides for a free flow of fluid in the "open" position and a reduced flow of fluid in the "closed" position. A continuous slot communicating with two overflow ducts arranged in the outer surface area of the valve body is arranged on one end of the valve body to throttle the flow. The sealing fit is formed by the end face of the valve body with the inner end face of the bore hole of the housing in which the valve body is arranged so as to be displaceable axially. The necessary contact pressure force is produced by a spring which is arranged in the bore hole of the housing and is supported on the valve body on one side and at a plug arranged in the bore hole on the other side. The housing of the valve is provided with two working connections. One working connection is arranged coaxially with the bore hole of the housing and the other working connection opens into the bore hole at right angles thereto. In the event that the narrow throttle slot becomes clogged with particles, the slot may be rinsed out in the "open" position of the valve. However, in order to do this the pressure in the working connection coaxial to the bore hole must be high enough to overcome the opposing spring force. In so doing, the prevailing counter-pressure in the other working connection must also be taken into account. One disadvantage of this valve is that it cannot be easily installed in a fluid line because the working connections are arranged at right angles to one another and the slot can only be rinsed out in the "open" position. A further disadvantage consists in the costly manufacture of the valve housing with the long, accurately aligned tailored bore hole and the sealing inner end face. The cost of construction is further increased by the arrangement of a plug which is tight against high pressure for supporting the spring.

A flow limiting throttle element of the generic type is known from DE-GM 7016093. This flow limiting throttle element has a pressure-tight housing with two working connections arranged coaxially to one another. A valve body in the form of a truncated cone which is freely displaceable axially is arranged in a bore hole of the housing and is provided at one end with a slot forming an overflow duct. The sealing fit is formed by the conical surface of the valve body in cooperation with a corresponding surface in the housing. A bore hole with a diameter between 0.07 and 0.1 mm is arranged on the small end face of the valve body for throttling the flow of gas.

The continuous slot is closed by the conical surface of the housing in the "closed" position and the gas can only flow through the small bore hole of the valve body. In the "open" position, the continuous slot and the annular space formed between the conical outer surface area of the valve body and the bore hole of the housing forms overflow ducts which provide for a free passage of the gas.

A disadvantage of this construction is that the valve body is guided at only one end, which does not exclude tilting. Also, the large sealing surfaces which are adapted to one another are costly to produce and it is not possible to rinse out the bore hole if the latter should become clogged.

SUMMARY OF THE INVENTION

The present invention has the object of providing a nonadjustable flow limiting throttle element which is self-cleaning in a simple manner and can be produced simply and economically with low weight and is suitable particularly for the hydraulic system in aircraft.

Pursuant to this object, and others which will become apparent hereafter, one aspect of the present invention resides in a flow limiting throttle element comprised of a pressure-tight housing having a first bore hole portion, a second bore hole portion adjoining the first bore hole portion and two coaxially arranged working connections. A substantially cylindrical piston is arranged in the first bore hole portion of the housing so as to be freely axially displaceable therein. The first bore hole portion having a length that is at least 50% of the overall piston length. Overflow ducts are arranged in an outer surface area of the piston and the second bore hole portion of the housing has a cylindrical recess which communicates with the overflow ducts and transits into a first one of the working connections. The first working connection having an inner diameter that is smaller than the inner diameter of the second bore hole portion. Additionally, a connection nipple is sealingly arranged in the first working connection. The connection nipple has an annular end face which is situated in the housing so as to project into a region of the cylindrical recess and form a sealing fit with an end face of the piston which faces the nipple end face. A continuous slot is arranged on the end face of the piston so as to continuously communicate with the cylindrical recess of the second bore hole portion without regard to the axial position of the piston.

In a further embodiment of the invention one of the overflow ducts is a transverse bore hole that extends through the piston. The piston has a second end face and a pocket bore hole which proceeds from the second end face and opens into the transverse bore hole through the piston. The transverse bore hole communicates with the cylindrical recess of the second bore hole portion regardless of the axial position of the piston.

In yet another embodiment of the invention, the piston has a guidance region with at least one straight portion that diverges from a circular shape. The straight portion having an axial length that corresponds at least to the length of the first bore hole portion of the housing. The piston can also have a region with reduced diameter that adjoins the first bore hole portion and communicates with the recess of the second bore hole portion regardless of the axial length of the piston.

Accordingly, a dependable guidance is ensured and tilting is excluded. This exact guidance is also necessary, since the sealing fit region is kept very small. It is formed from the annular end face of the connection nipple which is constructed as a standard screw fitting and is arranged in a sealing manner in one of the working connections and cooperates with the end face of the piston associated with it. The advantage of this arrangement is that the sealing fit can be produced at low cost, since the two surfaces of the sealing fit are easily accessible before assembling and can accordingly be machined or worked. The manufacturing cost for a sealing fit surface arranged in a bore hole is considerably higher.

The continuous slot can be rinsed out in a simple manner merely by briefly reversing the flow of fluid. The piston is freely movable and free of forces when there is a pressure balance in the two working connections. An "open" position of the valve is not required for rinsing, since this may be adequately accomplished by briefly lifting the end face with the slot from the sealing fit. This quick rinsing is particularly important for hydraulic systems in aircraft, e.g. for actuating the wheel fairing or landing gear flaps. In this regard, it is very important that the working cylinder actuating the landing gear flaps can be moved into the required end position and does not remain stuck in a halfway position due to inadequate hydraulic feed. This could happen, for example, if a particle of dirt were lodged in the slot as the working cylinder moves out, thus restricting further supply of hydraulic fluid so that there would not be sufficient pressure to fully displace the piston of the working cylinder.

The valve has overflow ducts so that the fluid can pass the piston without hindrance in the "open" position of the valve. These overflow ducts could be bore holes arranged at right angles to one another or straight milled surfaces in the guidance region of the piston. This ensures that these overflow ducts always communicate with the cylindrical recess in the housing bore hole regardless of the axial position of the piston.

The suggested flow limiting throttle element can also easily be made to operate as a true non-return valve or check valve by omitting the slot arranged on the end face. It would then be necessary to machine the abutting or stopping end face of the piston as well as the annular end face of the connection nipple so that the piston truly seals.

A continuous slot is also arranged on the end face of the piston remote of the connection nipple so that the element can be used as a throttle element for both flow directions. However, this can be effected only in connection with the suggested overflow duct in the form of a milled straight surface. Moreover, it is required that the depth of the milled surface be selected so that the edge of the surface lies outside the bore hole surface of the working connection. The cross sections of the slots arranged at the two end faces can be selected so that the throttle effect is identical or different in the two directions.

Depending on requirements, the piston may be manufactured from a metallic material or from fiber-reinforced plastic. In the latter case, the weight of the element is correspondingly reduced.

The advantage of the suggested flow limiting throttle element is that the element is lighter in weight while retaining the self-cleaning function, since it has only a few structural component parts. Further, manufacturing is more economical since standardized parts are used, with the exception of the piston. Such an element can also be installed without an adapter in any delivery line when the working connection or connection nipple is designed in a corresponding manner.

The flow limiting throttle element according to the invention is explained in more detail in the drawing with reference to two embodiments.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
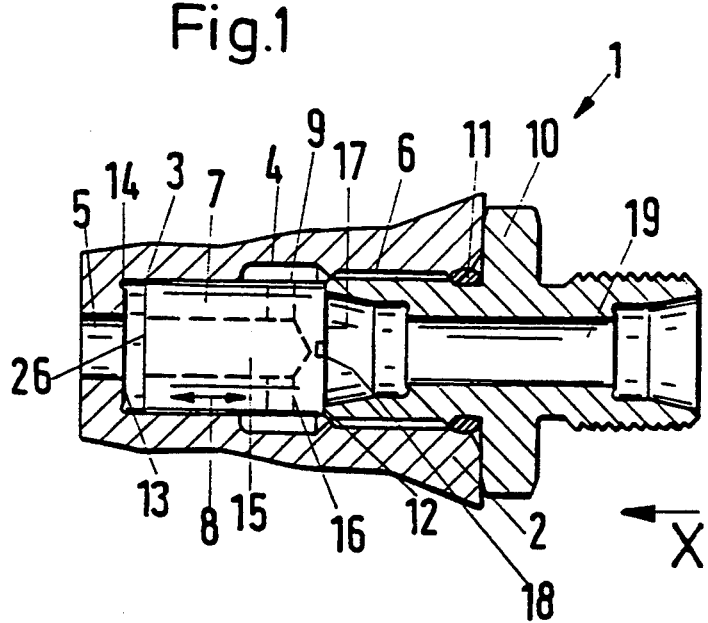
FIG. 1 shows a longitudinal section through a first embodiment of a flow limiting throttle element according to the invention.
Figure 2:
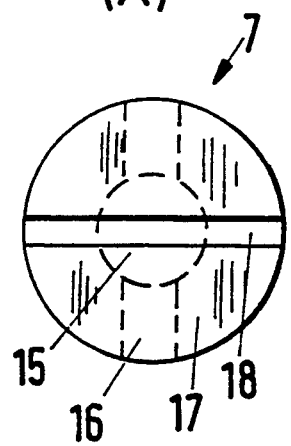
FIG. 2 shows an enlarged top view of the piston in the direction X.

FIG. 1 shows a first embodiment of the flow limiting throttle element according to the invention in longitudinal section. FIG. 2 shows an enlarged top view of the piston 7 in the direction indicated by the arrow X. The throttle element is formed from a pressure-tight housing 2 which has a bore hole with two different longitudinal portions 3, 4 and two working connections 5, 6 arranged opposite one another coaxially. A piston 7 is arranged in the bore hole of the housing 2 and is guided in a first of the longitudinal portions 3 of the housing 2. The piston 7 is freely displaceable axially in the bore hole as indicated by the arrow 8. The second of the longitudinal portions 4 of the bore hole of the housing 2 has a cylindrical recess 9 so that an annular duct is formed between the outer surface area of the piston 7 and the inner surface of the recess 9. A standardized connection nipple 10 is screwed into the working connection 6 situated on the right-hand side of the housing 2. Since the screw thread does not ensure a reliable support, a seal 11 is arranged in the region of the stop face of the nipple 10. The two supports for the respective end position of the piston 7 are formed on one side by the inner annular end face 12 of the nipple 10 and on the other side by the inner end face 13 of the housing 2 into which the second working connection 5 opens. In order to prevent tilting pressure at the latter stop face, this end face 13 has a slight relief cut 14.

The operation of this element 1 is described as follows. The piston 7, which is freely displaceable axially, is set in motion 8 when a differential pressure prevails between the working connections 5 and 6. Assuming that the pressure is greater in the working connection 5 on the left-hand side, the piston 7 slides to the right as far as the annular stop face 12 of the nipple 10. Apart from a certain leakage rate, the fluid is compelled to flow through the pocket bore hole 15 of the piston 7 as a result of the guidance of the piston 7 in the first longitudinal portion 3 of the bore hole of the housing 2. This pocket bore hole 15 opens into a transverse bore hole 16 so that the fluid can flow on both sides into the annular space 9. A direct continued flow is prevented by the piston 7 contacting the end face 12 of the nipple due to the differential pressure acting on the left-hand end face 26 of the piston 7. It is only possible for the fluid to flow through the slot 18 arranged on the end face 17 of the piston 7 and the desired throttling action is achieved by means of the small cross section of the slot 18 in comparison to the ducts 15, 16 arranged in the piston body. Proceeding from this point, the fluid can flow unimpeded through the bore hole 19 of the nipple 10.

When the differential pressure is reversed, the piston 7 moves toward the left until it stops against the annular end face 13 of the housing 2. The movement of the piston 7 is effected by the influence of the differential pressure on the end face 17 of the piston 7. When the piston 7 slides away, a large open space is formed between the end face 17 of the piston 7 and the stop face 12 of the nipple 10 and the fluid can flow through this space unimpeded. The flow continues via the annular space 9 and the ducts 15, 16 of the piston 7.

As can readily be seen, this embodiment can be made to function as a true check valve in a simple manner by omitting the slot 18 of the end face 17 of the piston 7. With a correspondingly careful machining of the surface of the two abutting end faces 12, 17, the flow can be completely shut off in this flow direction, i.e. from left to right.

Figure 3:
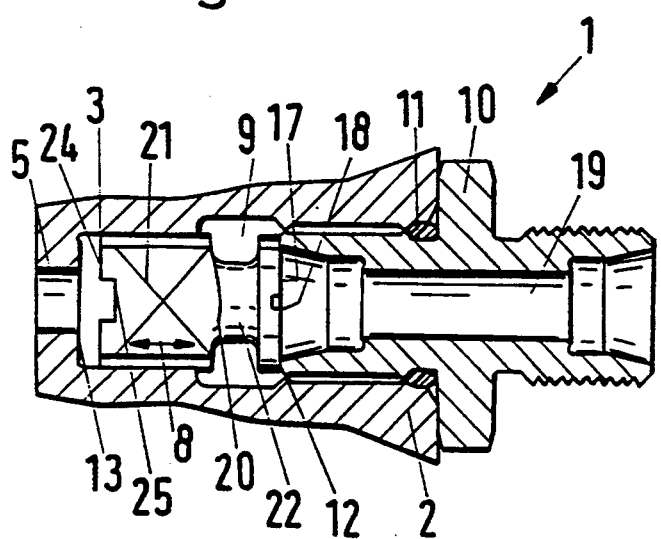
FIG. 3 shows a longitudinal section through another embodiment of the invention.
Figure 4:
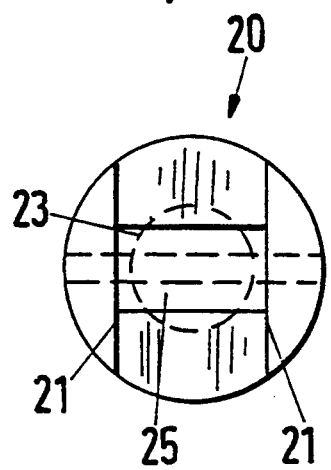
FIG. 4 shows an enlarged top view of the piston in the direction Y.

FIG. 3 shows another embodiment of the flow limiting throttle element 1 according to the invention, also in longitudinal section. FIG. 4 shows an enlarged top view of the piston 20 in the direction of the arrow Y. In order to simplify the description, the reference numbers are identical to those used in FIG. 1 for the same parts. The basic construction is similar to that of the embodiment shown in FIG. 1, only the piston 20 is designed differently. Instead of ducts 15, 16 (FIG. 1), two straight or even surfaces 21 are cut or milled for the overflow in the guidance region of the piston 20. The axial length of these milled surfaces 21 must correspond at least to the length of the first longitudinal portion 3 of the housing 2 so that the fluid can flow into the annular space 9. It is necessary to lengthen the milled surfaces 21 as far as the end region of the piston 7 to allow a free flow in the opposite direction, i.e. from working connection 6 to working connection 5. This ensures that a portion of the milled surfaces 21 projects into the annular space 9 when the piston 7 occupies the left-hand end position. Alternatively, it is also possible to lathe-turn a region 22 with a smaller diameter adjoining the milled surfaces 21 as shown in FIG. 3. This also ensures a free flow of the fluid from the working connection 6 to the working connection 5.

As shown in FIGS. 3 and 4, a continuous slot 25 is likewise arranged on the left-hand end face 24 of the piston 20 so that the element can be used as a throttle element for both flow directions. It is necessary for the edge of the milled surfaces 21 to lie outside the bore hole surface 23 of the working connection 5 so that the throttling can take effect via the slot 25. Otherwise, the fluid could flow off unimpeded and would not be compelled to flow through the slot 25. Depending on the selected cross section of the two slots 18, 25, the throttle effect can be made identical or different in the two flow directions. If this element is to function in the same way as in the embodiment shown in FIG. 1, the slot 25 is simply made larger in a corresponding manner. A description of the operation of this second embodiment may be dispensed with as it conforms in principle to the operation of the embodiment shown in FIG. 1 which was described above. The element shown in FIG. 3 can also be used as a true check valve in a simple manner by omitting the slot 18 on the right-hand end face 17 of the piston 7 or, alternatively, by omitting the slot 25 on the left-hand end face 24 of the piston 7.

The invention is not limited by the embodiments described above which are presented as examples only but can be modified in various ways within the scope of protection defined by the appended patent claims.

I claim:

1. A flow limiting throttle element for restricting the flow of a fluid guided in a delivery line, comprising:
    a pressure-tight housing having a first bore hole portion, a second bore hole portion adjoining the first bore hole portion and two coaxially arranged working connections;
    a piston arranged in the first bore hole portion of the housing so as to be freely axially displaceable therein, the first bore hole portion having a length that is at least 50% of the piston length, the second bore hole portion of the housing having a cylindrical recess which transits into a first one of the working connections, the first working connection having an inner diameter smaller than that of the second bore hole portion; and
    a connection nipple sealingly arranged in the first working connection, the connection nipple having an annular end face which is situated in the housing so as to project into a region of the cylindrical recess and form a sealing fit with a first end face of the piston which faces the nipple end face, a first continuous slot being arranged on the first end face of the piston so as to continuously communicate with the cylindrical recess of the second bore hole portion without regard to axial position of the piston.

2. A flow limiting throttle element according to claim 1, wherein the transition of the second bore hole portion of the housing to the first one of the working chambers is formed as a shoulder.

3. A flow limiting throttle element according to claim 1, wherein the transition of the second bore hole portion of the housing to the first one of the working chambers is formed as a relief.

4. A flow limiting throttle element according to claim 1, wherein the connection nipple is a screw fitting.

5. A flow limiting throttle element according to claim 1 additionally comprising overflow ducts arranged in the outer surface area of the piston, the cylindrical recess of the second bore hole portion of the housing being provided so as to communicate with the overflow ducts.

6. A flow limiting throttle element according to claim 5, wherein the overflow ducts include one overflow duct that is a transverse bore hole that extends through the piston, the piston having a second end face and a pocket bore hole which proceeds from the second end face and opens into the transverse bore hole that extends through the piston, the transverse bore hole communicating with the cylindrical recess of the second bore hole portion regardless of axial position of the piston.

7. A flow limiting throttle element according to claim 5, wherein the overflow duct comprises at least one straight portion in the piston that diverges from a circular shape, the straight portion having an axial length that corresponds at least to the length of the first bore hole portion of the housing.

8. A flow limiting throttle element according to claim 7, wherein the axial length of the straight portion of the piston corresponds to the length of the first bore hole portion of the housing, the piston further having a region with reduced diameter that adjoins the first bore hole portion and communicates with the recess of the second bore hole portion regardless of the axial length of the piston.

9. A flow limiting throttle element according to claim 7, wherein the piston has a second continuous slot at a second end face located opposite the connection nipple, an edge of the straight portion of the piston being outside a bore hole surface of a second of the working connections, as viewed from above.

10. A flow limiting throttle element according to claim 9, wherein the slots arranged in the end faces of the piston have identical cross-sections.

11. A flow limiting throttle element according to claim 9, wherein the slots arranged in the end faces of the piston have different cross-sections.

12. A flow limiting throttle element according to claim 9, wherein the second continuous slot has a correspondingly large cross-section so as to permit a free flow from the first working connection to the second working connection.

* * * * *